US012742463B2

(12) United States Patent
Wechsel

(10) Patent No.: US 12,742,463 B2
(45) Date of Patent: Sep. 22, 2026

(54) VALVE SECTION AND HYDRAULIC VALVE ASSEMBLY

(71) Applicant: HAWE Hydraulik SE, Aschheim (DE)

(72) Inventor: Thomas Wechsel, Aschheim (DE)

(73) Assignee: HAWE Hydraulik SE, Aschheim (DE)

( * ) Notice: Subject to any disclaimer, the term of this patent is extended or adjusted under 35 U.S.C. 154(b) by 0 days.

(21) Appl. No.: 19/254,345

(22) Filed: Jun. 30, 2025

(65) Prior Publication Data

US 2026/0002550 A1 Jan. 1, 2026

(30) Foreign Application Priority Data

Jul. 1, 2024 (DE) ..................... 10 2024 118 610.0

(51) Int. Cl.
*F15B 13/02* (2006.01)
*F15B 13/04* (2006.01)

(52) U.S. Cl.
CPC ........ *F15B 13/0402* (2013.01); *F15B 13/026* (2013.01); *F15B 13/0417* (2013.01); *F15B 2211/30525* (2013.01); *F15B 2211/30535* (2013.01); *F15B 2211/41509* (2013.01); *F15B 2211/515* (2013.01)

(58) Field of Classification Search
CPC .......... F15B 13/026; F15B 2211/30535; F15B 2211/41509; F15B 2211/50572
See application file for complete search history.

(56) References Cited

U.S. PATENT DOCUMENTS 4,617,854 A * 10/1986 Kropp ................... E02F 9/2232 91/531
5,937,645 A * 8/1999 Hamamoto ......... F15B 13/0417 60/426
6,397,591 B1 * 6/2002 Tsuruga ................ E02F 9/2271 91/446
6,772,590 B2 * 8/2004 Tsuruga ................ F15B 11/165 60/468
(Continued)

FOREIGN PATENT DOCUMENTS

DE 10253131 A1 * 5/2004 ............ E02F 9/2271
DE 102009010483 A1 * 8/2010 ............ F15B 11/055
(Continued)

*Primary Examiner* — Thomas E Lazo
(74) *Attorney, Agent, or Firm* — DINSMORE & SHOHL LLP

(57) ABSTRACT

A valve section includes a pressure channel, a load pressure signaling channel, a compound load pressure channel, a spool valve, a pressure compensator, a first and a second hydraulic connection and a first line connecting the pressure channel to the spool valve. The pressure compensator is disposed in the first line. A first pressure signal via a first pilot control line and a third pressure signal are applied to the pressure compensator on the closing side. A second pressure signal via a second pilot control line and a fourth pressure signal are applied to the pressure compensator on the opening side. A fifth pilot control line branches off between the pressure compensator and the spool valve and is connected to the second pilot control line. A first hydraulic resistor is disposed in the fifth pilot control line and a second hydraulic resistor is disposed in the second pilot control line.

15 Claims, 3 Drawing Sheets

(56) References Cited

U.S. PATENT DOCUMENTS

| | | | | |
|---|---|---|---|---|
| 10,550,862 | B2 * | 2/2020 | Wechsel | F15B 13/026 |
| 2003/0019209 | A1 * | 1/2003 | Tsuruga | E02F 9/2225<br>60/459 |
| 2009/0031719 | A1 * | 2/2009 | Tsuruga | E02F 9/2232<br>60/420 |
| 2016/0333898 | A1 * | 11/2016 | Wechsel | F15B 13/026 |

FOREIGN PATENT DOCUMENTS

| | | | | |
|---|---|---|---|---|
| DE | 102016117207 | A1 * | 3/2018 | F15B 1/02 |
| DE | 102020210441 | A1 * | 2/2022 | F15B 13/0433 |
| DE | 102021208053 | A1 * | 2/2023 | F15B 21/087 |

* cited by examiner

VALVE SECTION AND HYDRAULIC VALVE ASSEMBLY

CROSS REFERENCE TO RELATED APPLICATION

This application claims the priority benefit from German Patent Application No. 10 2024 118 610.0, filed on Jul. 1, 2024, the entire contents of which is incorporated herein by reference in its entirety.

FIELD

The present disclosure relates to a valve section for a hydraulic valve assembly and a hydraulic valve assembly with such a valve section.

BACKGROUND

Such hydraulic valve assemblies are known from the prior art, for example the applicant's product "PSL". These hydraulic valve assemblies regularly have a connection section and an end plate as well as a plurality of valve sections which are disposed between the connection section and the end plate. Each valve section normally has at least two hydraulic connections for connecting one or more hydraulic consumers.

The valve sections can be pressurized via a pressure channel, which connects the connection section to each valve section. The valve sections regularly each have a spool valve, an electrohydraulic pilot control for actuating the spool valve and an upstream pressure compensator. A common pilot pressure signal can be applied to the respective electrohydraulic pilot control of each valve section via the connection section in order to move the respective spool from the neutral position in order to actuate the connected hydraulic consumers (e.g. cylinders or hydraulic motors). Depending on the switching position of the spool valve, the pressure channel is connected to one of the two hydraulic connections via a first line, while the other hydraulic connection is connected to a return channel via a second line.

An upstream pressure compensator is a pressure compensator that is disposed upstream of the spool valve in the first line as seen in the direction of flow from the connection section to the spool valve. Such hydraulic valve assemblies are thus configured as load-sensing systems and have a load pressure collecting channel for signaling the highest load pressure present in the system. For signaling purposes, each valve section has a load pressure signaling channel connected to the load pressure collecting channel in order to signal the load pressure currently applied to the valve section.

In other words, the highest load pressure in the system is reported to all pressure compensators from all valve sections in order to regulate the total volume requirement of the hydraulic system, in that the valve section with the highest load pressure specifies the pump pressure to be set. The respective pressure compensator compares the load pressure in the corresponding valve section with the pump pressure. A pressure difference between the load pressure of the valve section and the pump pressure is normally set via a spring element in the pressure compensator. Due to the constant pressure difference, the volume flow depends only on the following flow area of the spool valve.

Such hydraulic valve assemblies or hydraulic systems with upstream pressure compensators are used in a wide variety of mobile hydraulic applications, such as forestry cranes, harvesters, feller bunchers or concrete pumps, due to their simple and proven flow control.

SUMMARY

The embodiments of a valve section for a hydraulic valve assembly are provided in the present disclosure. In one embodiment, the valve section includes a pressure channel, a return channel, a load pressure signaling channel, a load pressure collecting channel connected to the load pressure signaling channel, an assembly load pressure channel, a spool valve, a pressure compensator, a first hydraulic connection, a second hydraulic connection, a first line connecting the pressure channel to the spool valve and a second line connecting the return channel to the spool valve. The pressure compensator may be disposed in the first line. The spool valve can be switched to at least a first switching position and a second switching position. In the first switching position, the first hydraulic connection is connected to the first line and the load pressure signaling channel, and the second hydraulic connection is connected to the second line. In the second switching position, the second hydraulic connection is connected to the first line and the load pressure signaling channel, and the first hydraulic connection is connected to the second line. A first pilot control line connected to the pressure compensator on the closing side branches off between the pressure compensator and the spool valve. A first pressure signal is applied to the pressure compensator on the closing side. A second pilot control line connects the pressure compensator to the load pressure signaling channel on the opening side and a second pressure signal is applied to the pressure compensator on the opening side. A third pilot control line connected to the pressure compensator on the closing side branches off from the assembly load pressure channel and a third pressure signal is applied to the pressure compensator on the closing side. A fourth pilot control line connected to the pressure compensator on the opening side branches off between the pressure channel and the pressure compensator and a fourth pressure signal is applied to the pressure compensator on the opening side. A fifth pilot control line branches off between the pressure compensator and the spool valve. The fifth pilot control line is connected to the second pilot control line. A first hydraulic resistor may be disposed in the fifth pilot control line, and a second hydraulic resistor may be disposed in the second pilot control line.

In one aspect, the first hydraulic resistor is a first nozzle and the second hydraulic resistor is a second nozzle. The first nozzle may be an adjustable nozzle.

The first pressure signal may be damped via a third hydraulic resistor. The third hydraulic resistor is a third nozzle.

In one aspect, the pressure compensator includes a pressure compensator housing with a piston bore, a control piston, a first auxiliary piston and a second auxiliary piston. In one aspect, the control piston is guided axially movably in the piston bore and the control piston is guided on the first auxiliary piston. In one aspect, the second auxiliary piston is positively connected to the control piston.

In one aspect, the control piston comprises a first guide surface guided in the piston bore, a second guide surface guided in the piston bore and an at least partially circumferential recess located between the first guide surface and the second guide surface. In one aspect, a control edge is formed at the transition between the first guide surface and the recess. The control edge defines a flow area of the first line as a function of the axial position of the control piston in the piston bore.

In one aspect, the valve section comprises a plug. The second auxiliary piston is guided axially in the plug and defines a first chamber with the plug. The third pressure signal is applied to the first chamber.

In one aspect, the control piston comprises a first guide portion and the plug comprises a second guide portion. The first guide portion and the second guide portion engage with one another.

In one aspect, the first guide portion and the second guide portion define a second chamber. The control piston has at least one first connecting line connecting the second chamber to the first guide surface. The first pressure signal is applied to the second chamber.

In one aspect, the control piston, the first auxiliary piston and the pressure compensator housing define a third chamber. The second pressure signal is applied to the third chamber.

In one aspect, the first auxiliary piston and the control piston define a fourth chamber. The control piston has at least one second connecting line passing through the control piston from the recess into the fourth chamber. The fourth pressure signal is applied to the fourth chamber.

In one aspect, the control piston is movable in a first axial direction and the spool valve comprises a spool piston movable in a second axial direction, where the first axial direction and the second axial direction are not parallel.

In one aspect, the control piston comprises an eccentric bore with an only partially circumferential collar and the second auxiliary piston comprises a circumferential receptacle at its end facing the control piston. The partially circumferential collar is at least partially disposed in the receptacle when the second auxiliary piston is positively connected to the control piston.

A hydraulic valve assembly is also provided comprising at least one valve section according to the embodiments in the present disclosure.

In one embodiment, the hydraulic valve assembly comprises a connection section connected to the valve section. The load pressure signaling channel is connected to the load pressure collecting channel via a shuttle valve. The load pressure collecting channel is connected to the assembly load pressure channel via a load pressure connecting line of the connecting section. A fourth hydraulic resistor is disposed in the load pressure connecting line. The fourth hydraulic resistor may be a fourth nozzle.

DETAILED DESCRIPTION

Figure 1:
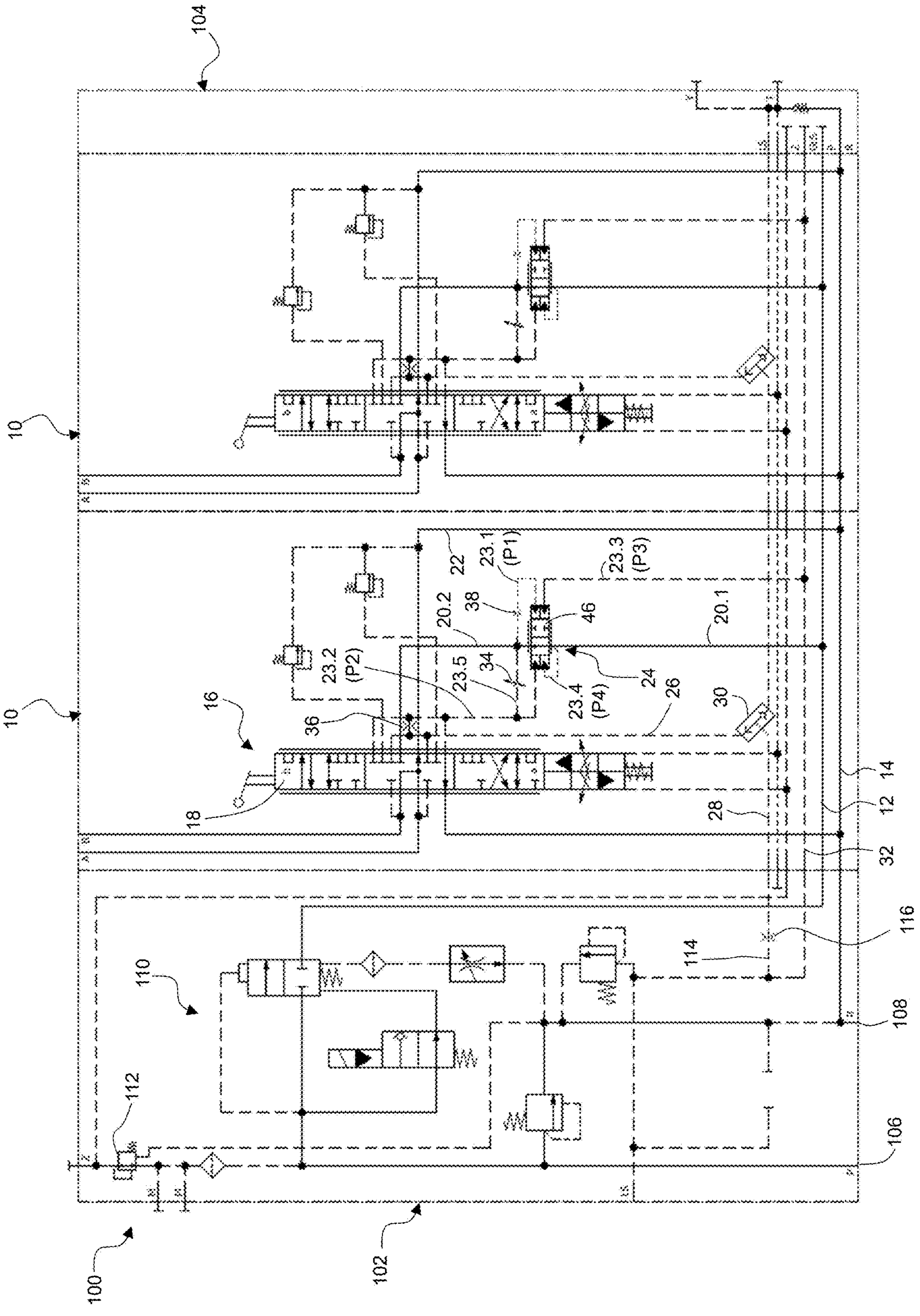
FIG. 1 shows a hydraulic circuit diagram of a hydraulic valve assembly with two valve sections according to the disclosure.

The disadvantage of the existing hydraulic systems with upstream pressure compensators is their behavior in the event of an undersupply e.g., if the maximum flow rate or volume flow of the pump is less than the sum of the quantities required by the connected hydraulic consumers. In the event of such an undersupply, the pressure compensators of the valve sections with the highest load pressures may no longer regulate and open completely. This is because in the event of an undersupply, the valve sections are supplied depending on their load pressure e.g., those valve sections with the lowest load pressure are supplied first. As a result, the hydraulic consumers with high load pressures are significantly reduced in speed or even come to a standstill.

This control behavior in the event of undersupply can be prevented by downstream pressure compensators, which is also referred to as “flow-sharing”. In such flow-sharing hydraulic systems, the pressure compensators are not disposed between the pump or connection section and the spool valve, but between the spool valve and the hydraulic consumer. If there is an undersupply in such a hydraulic system with downstream pressure compensators, the flow rate is reduced proportionally across all valve sections to be supplied. Individual hydraulic consumers are therefore not undersupplied and there is no standstill. However, the disadvantage of these hydraulic systems with downstream pressure compensators is higher energy consumption and increased heating of the hydraulic fluid. The use of hydraulic systems with downstream pressure compensators is significantly less attractive, particularly in view of the rare event of an undersupply.

Alternatively, an upstream pressure compensator can also be used, in which not only the load pressure of the individual valve section is reported, but also a load pressure signal is reported to the pressure compensator, which depends on the highest load pressure in the system. For this purpose, the corresponding valve section then has an assembly load pressure channel from which the corresponding load pressure signal is tapped. The highest load pressure present in the entire system is usually signaled via the connection section into the assembly load pressure channel. Such a hydraulic system is known, for example, from U.S. Pat. No. 5,937,645 A. A first pressure signal tapped between the pressure compensator and the spool valve is applied to the pressure compensator on the closing side via a first pilot control line, a second pressure signal tapped from the load pressure signaling channel is applied to the pressure compensator on the opening side via a second pilot control line, a third pressure signal tapped from the assembly load pressure channel via a third pilot control line is applied to the pressure compensator on the closing side and a fourth pressure signal tapped between the pressure channel and the pressure compensator is applied to the pressure compensator on the opening side via a fourth pilot control line. With pressure compensators of this type, the spring element required to set the pressure difference can also be omitted, which has an extremely favorable effect on the space requirement of the pressure compensator. For the purposes of the present disclosure, “on the opening side” refers to the direction of a pressure signal or a force that generates an opening movement of the pressure compensator. Consequently, “closing side” is understood to mean the direction of a pressure signal or a force which produces a closing movement of the pressure compensator.

For individual valve sections, it may be necessary to enable relatively high flow rates of more than 120 l/min and even more than 130 l/min. For this purpose, the known upstream pressure compensators also offer the possibility of providing sufficiently large flow areas with largely full opening. One possibility for this is to mechanically “pretension” the pressure compensator, but this is usually not possible for space reasons. Alternatively, the control piston of the pressure compensator can be enlarged, which is again problematic for space reasons, as the desired flow areas are maintained in order to avoid generating unacceptably high back pressures. Finally, it would also be possible to use a copy valve or several copy valves to increase the reported signals. If these valves are disposed in the connection section, the signals are increased globally for the entire hydraulic valve assembly. However, this is usually not desired, so the valves are disposed in the respective section. This increases costs and can lead to undesirable vibrations in the hydraulic system.

It is therefore the objective of the present disclosure to provide a simple and space-saving valve section with an upstream pressure compensator, with which high volume flows of more than 120 l/min are also possible and at the same time the risk of undersupply is reduced.

The solution to the problem is achieved with a valve section according to the embodiments in the present disclosure.

The solution to the problem is also achieved with a hydraulic valve assembly having at least one valve section according to the present disclosure. In some embodiments, the hydraulic valve assembly has a plurality of valve sections according to the present disclosure. In addition to the at least one valve section according to the present disclosure, the hydraulic valve assembly can also have "conventional" valve sections.

The valve section according to the present disclosure is distinguished from the systems known from the prior art in particular in that a fifth pilot control line branches off between the pressure compensator and the spool valve and the fifth pilot control line is connected to the second pilot control line. According to one aspect of the present disclosure, a first hydraulic resistor is disposed in the fifth pilot control line and a second hydraulic resistor is disposed in the second pilot control line.

According to the present disclosure, this results in a series connection of the first hydraulic resistor and the second hydraulic resistor, which causes the pressure difference applied to the pressure compensator to be injected on the opening side. As a result, an additional force component, which is dependent on the first and second hydraulic resistors, acts on the pressure compensator and increases the overall pressure difference, which in turn increases the flow rate flowing over the pressure compensator. The degree of injection can be specifically adjusted via the first hydraulic resistor and the second hydraulic resistor.

This can be explained using an example. Downstream of the pressure compensator, for example, 106 bar may be present in the first line. Downstream of the spool valve, 100 bar may be present at the first or second hydraulic connection, for example, due to the throttle point formed at the spool valve. This 100 bar is signaled via the load pressure signaling channel. In the fifth pilot control line, 106 bar is also present upstream of the first hydraulic resistor. There is 100 bar upstream of the second hydraulic resistor on the load pressure signaling channel side. Due to the series connection of the first hydraulic resistor and the second hydraulic resistor, the pressure applied in the second pilot control line can be set, for example to 103 bar, if the diameters of the hydraulic resistors are selected accordingly. This pressure is therefore applied to the pressure compensator on the opening side and not the pressure of the load pressure signaling channel, which is 3 bar lower, as is the case in the prior art.

In one aspect, the first hydraulic resistor is a first nozzle and/or the second hydraulic resistor is a second nozzle, whereby the first nozzle may be an adjustable nozzle. The degree of injection can be specifically selected via this nozzle chain. Furthermore, the adjustability of the first nozzle allows a certain degree of customization. The adjustability of the first nozzle can be made possible, for example, by a threaded throttle or by replacing the nozzle elements.

In one aspect, the first pressure signal is damped via a third hydraulic resistor, whereby the third hydraulic resistor is preferably a third nozzle. The third hydraulic resistor thus dampens possible vibrations occurring at the pressure compensator.

In one aspect, the pressure compensator comprises a pressure compensator housing with a piston bore and a control piston guided for axial movement in the piston bore. In one aspect, the pressure compensator also has a first auxiliary piston and a second auxiliary piston, whereby the control piston is guided on the first auxiliary piston and the second auxiliary piston may be positively connected to the control piston. It is possible that the pressure compensator housing is part of a housing of the valve section. The pressure compensator housing can be an integral part of the valve section housing or a separate part of the valve section housing. It is also possible that the second auxiliary piston is connected to the control piston in another way or is also formed in one piece with the control piston.

In one aspect, the control piston comprises a first guide surface guided in the piston bore, a second guide surface guided in the piston bore and an at least partially circumferential recess located between the first guide surface and the second guide surface. A control edge is formed at the transition between the first guide surface and the recess. The control edge defines a flow area of the first line depending on the axial position of the control piston in the piston bore. Thus, depending on the position of the control piston, the flow area of the first line is increased (and therefore more volume flow is permitted) or reduced (and therefore less volume flow is permitted). Due to the second pressure signal, the control piston is already "preloaded" in the opening direction. A further (second) control edge can be formed at the transition between the second guide surface and the recess.

In one aspect, the valve section comprises a plug, whereby the second auxiliary piston is guided axially in the plug and defines a first chamber with the plug and the third pressure signal is applied to the first chamber. The third pressure signal therefore acts on the second auxiliary piston and thus also on the control piston which is positively connected to it. The use of a plug also has the advantage over a direct guide in the pressure compensator housing that simplified production is possible. The plug can also be made of a material that differs from the material of the pressure compensator housing and is more wear-resistant, for example. This increases the service life of the pressure compensator with only a slight, if any, increase in material costs.

In one aspect, the control piston has a first guide portion and the plug may have a second guide portion, whereby the first guide portion and the second guide portion interlock. The first guide portion can, for example, be pot-shaped, so that the second guide portion-depending on the position of the control piston relative to the plug—is disposed at least partially radially within the first guide portion. Furthermore, the plug can have a stop against which the first guide portion abuts when the control piston is at maximum opening and which thus defines an end position of the control piston.

In one aspect, the first guide portion and the second guide portion define a second chamber, where the control piston comprises at least one first connecting line connecting the second chamber to the first guide surface and the first pressure signal is applied to the second chamber. The first pressure signal is tapped from the first line downstream of the pressure compensator and reported to the second chamber via the first connecting line, preferably via the third hydraulic resistor. Of course, the control piston can also have several first connecting lines, which may be evenly distributed.

In one aspect, the control piston, the first auxiliary piston and the pressure compensator housing define a third chamber, with the second pressure signal being applied to the third chamber. The first hydraulic resistor and the second hydraulic resistor are thus connected in series, so that a (second) pressure signal acts in the third chamber which is smaller than the first pressure signal present in the second chamber. The pressure signal in the third chamber therefore only acts on the control piston. The first auxiliary piston is held in its position due to the higher pressure in the third chamber. It is also possible that the third chamber, viewed in the axial direction in relation to the control piston, is additionally formed by an element adjacent to the valve section, for example a connection section, an end plate or a further valve section. It is also possible that the first auxiliary piston is fixed to the adjacent element or is formed in one piece with it.

In one aspect, the first auxiliary piston and the control piston define a fourth chamber, with the control piston having at least one second connecting line passing through the control piston from the recess into the fourth chamber, with the fourth pressure signal being applied to the fourth chamber. It is of course also conceivable that the control piston has a plurality of preferably evenly arranged second connecting lines. The fourth pressure signal is tapped from the first line upstream of the pressure compensator and reported to the fourth chamber via the at least one second connecting line.

In one aspect, the control piston is movable in a first axial direction and the spool valve preferably has a spool piston movable in a second axial direction, whereby the first axial direction and the second axial direction are not parallel. In a lateral projection, the first axial direction and the second axial direction are preferably perpendicular to each other. In other words, the control piston is disposed transversely to the spool piston in the valve section, so that a particularly compact valve section is achieved.

In one aspect, the control piston has an eccentric bore with an only partially circumferential collar. The second auxiliary piston preferably has a circumferential receptacle at its end facing the control piston, whereby the partially circumferential collar is at least partially disposed in the receptacle when the second auxiliary piston is positively connected to the control piston. To assemble the pressure compensator, the second auxiliary piston is therefore inserted eccentrically into the first guide portion and moved axially along the eccentric bore. As soon as the end position is reached, the second auxiliary piston is moved radially so that the partially circumferential collar engages in the receptacle. Axial movement of the second auxiliary piston relative to the control piston is then no longer possible due to this positive connection.

In one aspect, the hydraulic valve assembly has a connection section connected to the valve section. The load pressure signaling channel is preferably connected to the load pressure collecting channel via a shuttle valve, and the load pressure collecting channel is preferably connected to the assembly load pressure channel via a load pressure connecting line of the connection section. It is also preferable if a fourth hydraulic resistor is disposed in the load pressure connecting line. The fourth hydraulic resistor can be a fourth nozzle. In this way, the third pressure signal can be influenced globally in order to achieve the desired control behavior of the pressure compensators.

FIG. 1 shows a hydraulic circuit diagram of a hydraulic valve assembly 100 according to the disclosure. In this exemplary embodiment, the hydraulic valve assembly 100 has two identically constructed valve sections 10, a connection section 102 and an end plate 104. Of course, the hydraulic valve assembly 100 can also have only one valve section 10 or more than two valve sections 10. Furthermore, the valve sections do not have to have an identical configuration, but can also differ in their configuration depending on the requirements. In FIG. 1, for reasons of clarity, reference signs are only shown in the valve section 10 disposed directly next to the connection section 102. Furthermore, only one valve section 10 is described below, whereby the explanations also apply accordingly to the other valve section 10.

In the exemplary embodiment shown in FIG. 1, the valve sections 10 are supplied with pressure via the connection section 102 by connecting a pump (not shown) to the pump connection 106 in a known manner. Returning hydraulic fluid is discharged into a tank (not shown) via the tank connection 108, also in a known manner. In this exemplary embodiment, the connection section 102 has an supply regulator 110 for use with a variable displacement pump. Of course, a connection section 102 with a flow control valve with circulation circuit for use with a fixed displacement pump can also be used. Furthermore, the connection section 102 has a pilot pressure valve 112 in the form of a pressure control valve in order to provide a pilot pressure to the valve sections 10 in a known manner.

The valve section 10 has a pressure channel 12 and a return channel 14. The pressure channel 12 is pressurized in a known manner via the supply regulator 110 and the return channel 14 is connected to the tank connection 108 in a known manner via the connection section 102.

Furthermore, the valve section 10 comprises a spool valve 16 with a spool piston 18. The spool valve 16 is connected to the pressure channel 12 via a first line 20.1, 20.2 and to the return channel 14 via a second line 22. The spool valve 16 is configured in a known manner as a proportional and pilot-controlled spool valve 16 and can be switched from the neutral position shown in FIG. 1 to a first switching position a and a second switching position b. In the first switching position a, a first hydraulic connection A of the valve section 10 is connected to the first line 20.1, 20.2 and a second hydraulic connection B of the valve section 10 is connected to the second line 22. Accordingly, in the second switching position b, the first hydraulic connection A is connected to the second line 22 and the second hydraulic connection B is connected to the first line 20.1, 20.2. In the neutral position shown in FIG. 1, both the first hydraulic connection A and the second hydraulic connection B are connected to the second line 22 and therefore relieved to the tank. The first line 20.1, 20.2 is blocked in the neutral position. A hydraulic consumer or several hydraulic consumers can be connected to the hydraulic connections A and B in a known manner, for example a hydraulic cylinder.

A pressure compensator 24 is also disposed in the first line 20.1, 20.2. The pressure compensator 24 is configured as a proportional pressure compensator 24 and controls the inflow to the spool valve 16 located downstream of the pressure compensator 24 and thus to the supplied hydraulic connection A or B. The pressure compensator 24 is thus configured as a so-called upstream pressure compensator 24, since it is disposed upstream of the spool valve 16 and downstream of the connection section 102. In the following, the reference symbol 20.1 is used for the part of the first line located upstream of the pressure compensator 24 and the reference symbol 20.2 is used for the part of the first line located downstream of the pressure compensator 24.

Furthermore, the hydraulic valve assembly 100 comprises an LS system ("load sensing"). For this purpose, the valve section 10 has a load pressure signaling channel 26 and a load pressure collecting channel 28. The load pressure signaling channel 26 is connected to the load pressure collecting channel 28 via a shuttle valve 30. This ensures that the highest load pressure occurring in the hydraulic valve assembly 100 is always present in the load pressure collecting channel 28. The load pressure collecting channel 28 is connected to an assembly load pressure channel 32 of the valve section 10 via a load pressure connecting line 114 in the connection section 102. A uniform pressure signal is provided for all valve sections 10 via the assembly load pressure channel 32, which represents the highest load pressure occurring in the hydraulic valve assembly 100.

As shown in FIG. 1, the load pressure signaling channel 26 downstream of the spool valve 16 is connected to the first hydraulic connection A or the second hydraulic connection B depending on the present switching position a or b. The currently applied load pressure of the valve section 10 is thus reported to the shuttle valve 30 via the load pressure signaling channel 26 and, if there is sufficient height to switch the shuttle valve 30, also to the load pressure collecting channel 28.

The pressure compensator 24 does not have a control spring for setting the pressure difference (Δp). Instead, a total of four pressure signals P1 to P4 are reported to the pressure compensator 24. For this purpose, the valve section comprises a first pilot control line 23.1, which branches off from the first line 20.2 downstream of the pressure compensator 24 and is connected to the pressure compensator on the closing side. A first pressure signal P1 is thus reported to the pressure compensator 24 on the closing side via the first pilot control line 23.1. A second pilot control line 23.2 branches off from the load pressure signaling channel 26 and is connected to the pressure compensator 24 on the opening side. A second pressure signal P2 is applied to the pressure compensator on the opening side via the second pilot control line 23.2, as will be described in more detail below. A third pilot control line 23.3 branches off from the assembly load pressure channel 32 and is connected to the pressure compensator 24 on the closing side. A third pressure signal P3 is thus reported to the pressure compensator 24 on the closing side. A fourth pilot control line 23.4 branches off upstream of the pressure compensator 24 from the first line 20.1 and is connected to the pressure compensator 24 on the opening side. A fourth pressure signal P4 is thus reported to the pressure compensator 24 on the opening side. A fifth pilot control line 23.5 branches off downstream of the pressure compensator 24 from the first line 20.2 and is connected to the second pilot control line 23.2.

As shown in FIG. 1, a first hydraulic resistor 34 is disposed in the fifth pilot control line 23.5. In this exemplary embodiment, the first hydraulic resistor 34 is a first, adjustable nozzle. Furthermore, a second hydraulic resistor 36 in the form of a second nozzle is disposed in the second pilot control line 23.2. As can be seen from the circuit shown in FIG. 1, the first nozzle 34 and the second nozzle 36 are connected in series in the form of a nozzle chain.

In FIG. 1, a third hydraulic resistor 38 influencing the first pressure signal P1 is also provided. The third hydraulic resistor 38 can be a third nozzle and dampens possible vibrations occurring at the pressure compensator 24. Furthermore, a fourth hydraulic resistor 116 in the form of a fourth nozzle is provided in the load pressure connecting line 114, which has a damping function This means that the currently applied load pressure of the valve section 10 and the controlled pressure (via the pressure signal P1) are not reported to the pressure compensator 24 for controlling the volume flow, as is the case with known pressure compensators. Instead, a pressure signal dependent on the highest load pressure currently present in the system (via pressure signal P3) and the pump pressure present in pressure channel 12 (via pressure signal P4) are also reported to pressure compensator 24. By reporting these pressure signals, a control spring for setting the pressure difference Δp can be omitted. The second pressure signal P2 acting on the opening side enables a type of "volume flow boost", as the Δp is increased due to the nozzle chain formed by the first nozzle 34 and the second nozzle 36, namely by a pressure amount resulting from the selection of the diameters of the first nozzle 34 and the second nozzle 36. Assuming a Δp of, for example, 6 bar without the fifth pilot control line 23.5 and the nozzle chain, the first nozzle 34 and the second nozzle 36 can be selected so that the second pressure signal P2 increases the actual Δp by 3 bar to 9 bar, for example by selecting both nozzles with a diameter of 0.8 mm. This enables an increased volume flow of over 120 l/min via the pressure compensator 24, for example, compared to conventional pressure compensator control.

This can be explained using an example. Downstream of the pressure compensator 24, for example, 106 bar may be present in the first line 20.2. Downstream of the spool valve 16, 100 bar may be present at the first or second hydraulic connection A, B, for example, due to the throttle point formed at the spool valve. This 100 bar is signaled via the load pressure signaling channel 26. In the fifth pilot control line 23.5, 106 bar is also present upstream of the first nozzle 34. There is 100 bar upstream of the second nozzle 36 on the side of the load pressure signaling channel 26. Due to the series connection of the first nozzle 34 and the second nozzle 36, the pressure applied in the second pilot control line 23.2 or the second pressure signal P2 can be set, for example to 103 bar, by selecting the diameters of the nozzles 34, 36 accordingly. Consequently, this pressure is applied to the pressure compensator 24 on the opening side and not the pressure of the load pressure signaling channel 26, which is 3 bar lower, as is the case in the prior art.

Figure 2:
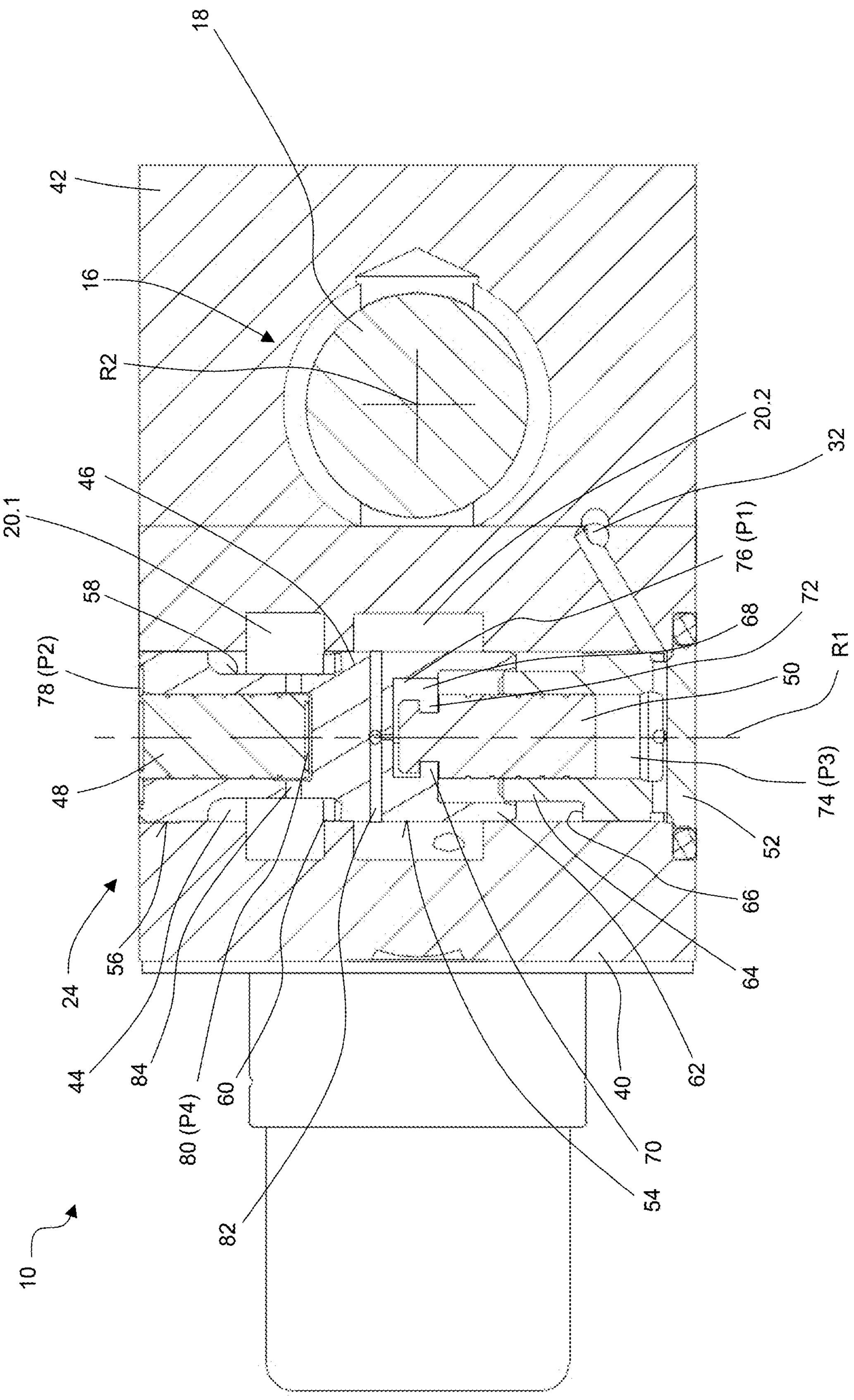
FIG. 2 shows a first cross-section through a pressure compensator of a valve section according to the disclosure.
Figure 3:
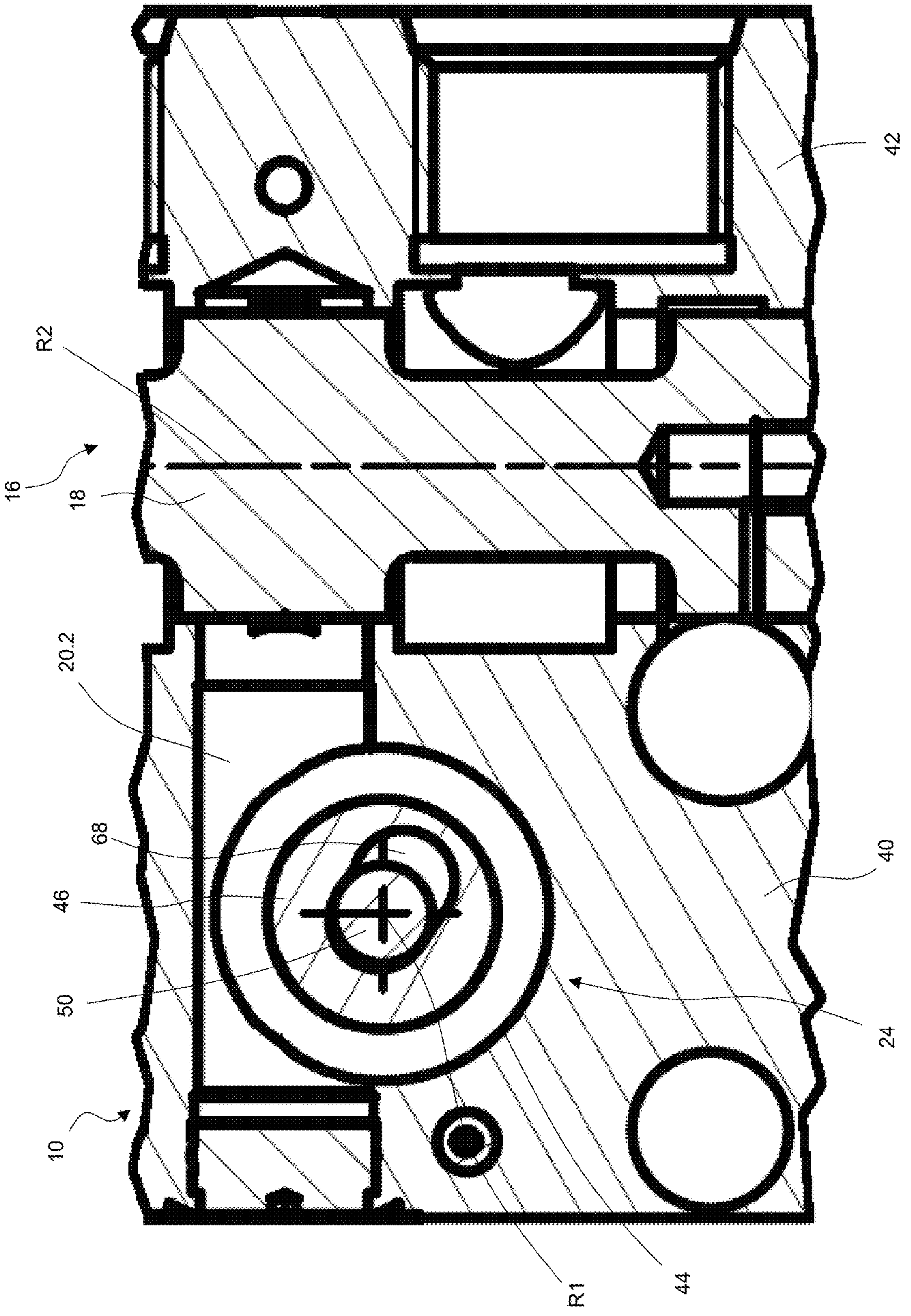
FIG. 3 shows a second cross-section through a pressure compensator of a valve section according to the disclosure.

The configuration of the pressure compensator 24 is explained in more detail below with reference to FIGS. 2 and 3. FIG. 2 shows a first cross-section through a valve section 10 and FIG. 3 shows a second cross-section through the valve section 10.

As shown, the pressure compensator 24 comprises a pressure compensator housing 40. The pressure compensator housing 40 can be configured as a separate housing or can also be an (integral) part of a housing 42 of the valve section 10. In this exemplary embodiment, the pressure compensator housing 40 is configured separately. The pressure compensator housing 40 comprises a piston bore 44, a control piston 46, a first auxiliary piston 48, a second auxiliary piston 50 and a plug 52. The control piston 46, the first auxiliary piston 48 and the second auxiliary piston 50 are disposed in the piston bore 44. The control piston 46 and the second auxiliary piston 50 are axially movable along a first axial direction R1. The spool piston 18 is disposed in a corresponding spool bore in the housing 42 of the valve section 10 so as to be axially movable along a second axial direction R2. As shown, the first axial direction R1 and the second axial direction R2 are not parallel to each other. Rather, the pressure compensator 24 is arranged transversely to the spool valve 16

The plug 52 closes the piston bore 44 at one axial end of the piston bore 44, which is closer to the second auxiliary piston 50. The other axial end of the piston bore 44 is closed by the housing of an adjacent valve section (or by the connection section 102) when the hydraulic valve assembly 100 is assembled. It is conceivable that the first auxiliary piston 48 is fixed to this adjacent housing or is formed integrally therewith. The control piston 46 has a first guide surface 54, a second guide surface 56 and a circumferential recess 58 located between the first guide surface 54 and the second guide surface 56. A control edge 60 is formed at the transition from the first guide surface 54 to the recess 58. The first guide surface 54 and the second guide surface 56 are guided on corresponding inner circumferential surfaces of the piston bore 44. In the position of the control piston 46 shown in FIG. 2, the control edge 60 completely blocks the first line 20.1. When the control piston 46 moves in the direction of the plug 52, the control edge 60 increasingly releases the first line 20.1 with increasing movement of the control piston 46 and thus increases the flow area over which hydraulic fluid can flow via the first line 20.1 from the pressure channel 12 to the pressure compensator 24 and then further via the first line 20.2 to the spool valve 16. Consequently, the control edge 60 defines the flow area of the first line 20.1, 20.2 as a function of the axial position of the control piston 46 relative to the piston bore 44.

The control piston 46 is guided on the first auxiliary piston 48. The second auxiliary piston 50 is positively connected to the control piston 46, as will be explained in more detail below. In this exemplary embodiment, the first auxiliary piston 48 and the second auxiliary piston 50 have an identical outer diameter. The control piston 46 has a first pot-like guide portion 62, which engages with a second guide portion 64 of the plug 52. As can be clearly seen in FIG. 2, the second guide portion 64 is disposed at least partially radially within the first guide portion 62. This results in particularly good guidance of the control piston 46.

At the end of the second guide portion 64, the plug 52 comprises a stop 66 against which the first guide portion 62 of the control piston 46 abuts in an end position. It can also be seen that the second auxiliary piston 50 is guided in the plug 52.

The control piston 46 comprises an eccentric bore 68 disposed within the first guide portion 62. A partially circumferential collar 70 is provided at the end of the eccentric bore 68 facing the plug 52. At its end facing the control piston 46, the second auxiliary piston 50 has a circumferential receptacle 72 in which the collar 70 is received. For assembly, the second auxiliary piston 50 is moved along the eccentric bore 68 until the receptacle 72 is leveled with the collar 70. The second auxiliary piston 50 is then moved radially so that the collar 70 engages in the receptacle 72. This creates a positive fit between the second auxiliary piston 50 and the control piston 46, so that the second auxiliary piston 50 and the control piston 46 move together.

The second auxiliary piston 50 and the plug 52 define a first chamber 74, to which the third pressure signal P3 is applied. The first guide portion 62 and the second guide portion 64 define a second chamber 76, to which the first pressure signal P1 is applied. The first pressure signal P1 is tapped from the first line 20.1 via a plurality of evenly arranged first connecting lines 82 and signaled to the second chamber 76. As shown, the first connecting lines 82 connect the second chamber 76 to the first line 20.1 by extending from the first guide surface 54 to the second chamber 76 in the form of at least one radial bore and at least one adjoining axial bore in the control piston 46. The control piston 46, the first auxiliary piston 48 and the pressure compensator housing 40 (as well as the adjacent component of the hydraulic valve assembly 100) define a third chamber 78, to which the second pressure signal P2 is applied. The control piston 46 and the first auxiliary piston 48 further define a fourth chamber 80, which is connected to the recess 58 via a plurality of evenly spaced second connecting lines 84, so that the pressure applied upstream of the pressure compensator 24 in the first line 20.1 is reported to the fourth chamber 80 in the form of the fourth pressure signal P4. Since the first pressure signal P1 present in the second chamber 76 is always higher than the second pressure signal P2 present in the third chamber 78, the second pressure signal P2 acts only on the annular surface formed by the end face of the control piston 46. The first auxiliary piston 48 does not move and remains in the position shown in FIG. 2.

Due to this configuration of the pressure compensator 24, the pressure compensator reacts not only to the local load pressure of the valve section 10, but also to the global load pressure of the hydraulic valve assembly 100 (e.g., to the third pressure signal P3). If the load pressure of the valve section 10 is thus lower than the highest load pressure in the hydraulic valve assembly 100, the third pressure signal P3 in the first chamber 74 is applied on the closing side via the second auxiliary piston 50 to the control piston 46 and the flow area of the first line 20.1 defined by the control edge 60 is thus reduced. Furthermore, the nozzle chain formed by the first nozzle 34 and the second nozzle 36 increases the $\Delta p$ by a constant amount (for example by 3 bar), so that the flow area defined by the control edge 60 enables a higher volume flow compared to a conventional pressure compensator.

Finally, it should be noted that the exemplary embodiment shown in FIG. 1 can also have further valve sections that are not configured with a pressure compensator 24 described above, but have a conventional pressure compensator, or a pressure compensator in which the second pressure signal is not reported to the pressure compensator. The terms used herein, such as “first”, “second” or “third”, do not specify a concrete sequence, but serve solely to distinguish the individual elements conceptually. For example, if required, an embodiment can be provided that comprises a fourth nozzle but no third nozzle.

The invention claimed is:

1. A valve section for a hydraulic valve assembly, comprising:

a pressure channel;
a return channel;
a load pressure signaling channel;
a load pressure collecting channel connected to the load pressure signaling channel;
an assembly load pressure channel;
a spool valve;
a pressure compensator;
a first hydraulic connection;
a second hydraulic connection; and
a first line connecting the pressure channel to the spool valve and a second line connecting the return channel to the spool valve;
wherein the pressure compensator is disposed in the first line, wherein the spool valve is switchable to at least a first switching position and a second switching position, wherein in the first switching position the first hydraulic connection is connected to the first line and the load pressure signaling channel and the second hydraulic connection is connected to the second line, wherein in the second switching position the second hydraulic connection is connected to the first line and the load pressure signaling channel and the first hydraulic connection is connected to the second line, wherein a first pilot control line connected to the pressure compensator on a closing side branches off between the pressure compensator and the spool valve and a first pressure signal is applied to the pressure compensator on the closing side, wherein a second pilot control line connects the pressure compensator to the load pressure signaling channel on an opening side and a second pressure signal is applied to the pressure compensator on the opening side, wherein a third pilot control line connected to the pressure compensator on the closing side branches off from the assembly load pressure channel and a third pressure signal is applied to the pressure compensator on the closing side, wherein a fourth pilot control line connected to the pressure compensator on the opening side branches off between the pressure channel and the pressure compensator and a fourth pressure signal is applied to the pressure compensator on the opening side, wherein a fifth pilot control line branches off between the pressure compensator and the spool valve, wherein the fifth pilot control line is connected to the second pilot control line, wherein a first hydraulic resistor is disposed in the fifth pilot control line, and wherein a second hydraulic resistor is disposed in the second pilot control line.

2. The valve section according to claim 1, wherein the first hydraulic resistor is a first nozzle and the second hydraulic resistor is a second nozzle, wherein the first nozzle is an adjustable nozzle.

3. The valve section according to claim 1, wherein the first pressure signal is damped via a third hydraulic resistor, the third hydraulic resistor being a third nozzle.

4. The valve section according to claim 1, wherein the pressure compensator comprises a pressure compensator housing with a piston bore, a control piston, a first auxiliary piston and a second auxiliary piston, wherein the control piston is guided axially movably in the piston bore and the control piston is guided on the first auxiliary piston, and wherein the second auxiliary piston is preferably positively connected to the control piston.

5. The valve section according to claim 4, wherein the control piston comprises a first guide surface guided in the piston bore, a second guide surface guided in the piston bore and an at least partially circumferential recess located between the first guide surface and the second guide surface, wherein a control edge is formed at a transition between the first guide surface and the at least partially circumferential recess, wherein the control edge defines a flow area of the first line as a function of an axial position of the control piston in the piston bore.

6. The valve section according to claim 5, wherein the first auxiliary piston and the control piston define a fourth chamber, wherein the control piston has at least one second connecting line passing through the control piston from the at least partially circumferential recess into the fourth chamber, wherein the fourth pressure signal is applied to the fourth chamber.

7. The valve section according to claim 4, wherein the valve section comprises a plug, wherein the second auxiliary piston is guided axially in the plug and defines a first chamber with the plug, wherein the third pressure signal is applied to the first chamber.

8. The valve section according to claim 7, wherein the control piston comprises a first guide portion and the plug comprises a second guide portion, wherein the first guide portion and the second guide portion engage with one another.

9. The valve section according to claim 8, wherein the first guide portion and the second guide portion define a second chamber, wherein the control piston has at least one first connecting line connecting the second chamber to the first guide portion, wherein the first pressure signal is applied to the second chamber.

10. The valve section according to claim 4, wherein the control piston, the first auxiliary piston and the pressure compensator housing define a third chamber, wherein the second pressure signal is applied to the third chamber.

11. The valve section according to claim 4, wherein the control piston is movable in a first axial direction and the spool valve comprises a spool piston movable in a second axial direction, the first axial direction and the second axial direction not being parallel.

12. The valve section according to claim 4, wherein the control piston comprises an eccentric bore with a partially circumferential collar, wherein the second auxiliary piston comprises a circumferential receptacle at its end facing the control piston, wherein the partially circumferential collar is at least partially disposed in the circumferential receptacle when the second auxiliary piston is positively connected to the control piston.

13. A hydraulic valve assembly comprising at least one valve section according to claim 1.

14. The hydraulic valve assembly according to claim 13, wherein the hydraulic valve assembly comprises a connection section connected to the valve section, wherein the load pressure signaling channel is connected to the load pressure collecting channel via a shuttle valve, and wherein the load pressure collecting channel is connected to the assembly load pressure channel via a load pressure connecting line of the connecting section.

15. The hydraulic valve assembly according to claim 14, wherein a fourth hydraulic resistor is disposed in the load pressure connecting line, the fourth hydraulic resistor preferably being a fourth nozzle.

* * * * *